(12) United States Patent
Garifulin et al.

(10) Patent No.: US 7,494,016 B2
(45) Date of Patent: Feb. 24, 2009

(54) PNEUMATIC FLOTATION COLUMN

(75) Inventors: Igor Fagamjanowitsch Garifulin, Jekaterinburg (RU); Viktor Alexeewitsch Malzew, Jekaterinburg (RU); Marc Grigorjewitsch Viduyetsky, Jekaterinburg (RU)

(73) Assignees: Siemens Aktiengesellschaft, Munich (DE); Zao NPVZ Uralmechanobr-Technika, Ekaterinburg (RU)

( * ) Notice: Subject to any disclaimer, the term of this patent is extended or adjusted under 35 U.S.C. 154(b) by 0 days.

(21) Appl. No.: 11/721,019

(22) PCT Filed: Aug. 3, 2005

(86) PCT No.: PCT/EP2005/053796

§ 371 (c)(1),
(2), (4) Date: Oct. 17, 2007

(87) PCT Pub. No.: WO2006/061265

PCT Pub. Date: Jun. 15, 2006

(65) Prior Publication Data

US 2008/0041769 A1    Feb. 21, 2008

(30) Foreign Application Priority Data

Dec. 6, 2004   (RU) .............................. 2004135380

(51) Int. Cl.
*B03D 1/24* (2006.01)
(52) U.S. Cl. ..................................... 209/164; 209/170
(58) Field of Classification Search ................. 209/164, 209/170
See application file for complete search history.

(56) References Cited

U.S. PATENT DOCUMENTS

| 2,854,136 | A | * | 9/1958 | Gillie et al. | 209/158 |
| 2,965,557 | A | * | 12/1960 | Price | 208/390 |
| 3,322,272 | A | * | 5/1967 | Evans et al. | 209/17 |
| 3,525,437 | A | * | 8/1970 | Kaeding et al. | 210/221.2 |
| 4,247,391 | A | | 1/1981 | Lloyd | 209/164 |
| 4,722,784 | A | | 2/1988 | Barnscheidt | 209/164 |
| 5,651,879 | A | | 7/1997 | Gonzalez | 209/170 |

FOREIGN PATENT DOCUMENTS

DE   2836496 A1   2/1980

(Continued)

OTHER PUBLICATIONS

International Search Report PCT/EP2005/053796, 5 pages.

*Primary Examiner*—Thomas M Lithgow
(74) *Attorney, Agent, or Firm*—Baker Botts L.L.P.

(57) ABSTRACT

The machine productivity for a foam product is increased by increasing the surface of the enlarged upper part of the cylinder housing and by reducing material intensity by optimizing the dimensions thereof. This is obtained by determining the diameter of the enlarged housing part in the known machine which contains a cylinder housing consisting of an enlarged upper part and a lower part, and a feeder, ventilation and discharge device, embodied in the form of ejectors, a discharge device, and a foam collector container, with the aid of an equation according to the diameter of the lower part of the cylinder housing, the height of the cylinder housing and the height of the lower part of the cylinder housing. The foam collector container of the pneumatic flotation column is embodied in the shape of a gabled groove and is fitted with opposite connection parts used to discharge the foam product.

6 Claims, 3 Drawing Sheets

FOREIGN PATENT DOCUMENTS

| | | |
|---|---|---|
| ES | 8604229 | 6/1986 |
| FR | 2725208 A1 | 9/1994 |
| FR | 2726203 A | 10/1994 |
| RU | 2038865 | 7/1995 |
| RU | 2054972 | 2/1996 |
| RU | 2132749 | 7/1999 |

* cited by examiner

PNEUMATIC FLOTATION COLUMN

CROSS-REFERENCE TO RELATED APPLICATIONS

This application is a U.S. national stage application of International Application No. PCT/EP2005/053796 filed Aug. 3, 2005, which designates the United States of America, and claims priority to Russian Federation application number 2004135380 filed Dec. 6, 2004, the contents of which are hereby incorporated by reference in their entirety.

TECHNICAL FIELD

The invention relates to the treatment of mineral resources and may be used in the processing of mineral substances which contain nonferrous, black, rare and noble metals and also nonmetallic mineral resources. The invention relates to a pneumatic flotation column.

BACKGROUND

The pneumatic flotation machine protected by Russian Federation patent no. 2038865, B 03 D 1/24, is known. The machine contains a chamber with an aerator within the chamber, a foam overflow edge, a feed device as a tube with orifices and a circulation tube.

The pneumatic flotation machine is known which contains a chamber with an aerator within the chamber, a feed and discharge device, and an airlift arranged in the middle of the chamber and having a mixer in the lower part (see Russian Federation patent no. 2054972, B 03 D1/24).

The most similar to this in terms of its technical principle is the pneumatic flotation column which contains a cylindrical housing, consisting of the widened upper part and of the lower part, a feed device, designed as ejectors, a discharge device, aerators, a foam collecting container, a device, designed as an airlift, for the fine regulation of the pulp level in the machine, the annular baffle plate, which in cross section represents a triangle, the vertex of which is directed toward the machine axis, and a telescope-shaped chamber which is located in the widened housing part (see Russian Federation patent no. 2132749, B 03 D 1/24).

A known pneumatic flotation column, protected by Russian Federation patent no. 2132749, B 03 D 1/24, was implemented in the machine KFM-1400 (development of the "Uralmachanobr" Institute) and has the dimensions listed in Table 1.

TABLE 1

Housing dimensions of the pneumatic flotation column KFM-1400

| Brief designation | Designation of the individual housing parts | Dimension in meters (m) |
| --- | --- | --- |
| D | Diameter of the widened upper part of the cylindrical housing | 2.2 |
| d | Diameter of the lower part of the cylindrical housing | 1.4 |
| $h_1$ | Height of the widened upper part of the cylindrical housing | 4.24 |
| $h_2$ | Height of the lower part of the cylindrical housing | 4.42 |
| $h_1 + h_2$ | Overall height of the machine | 8.66 |

The known machine has the disadvantage that, when the required performance in terms of the feed and foam product is increased, the housing dimensions increase unjustifiably and thereby contribute to an appreciable rise in material intensity.

Furthermore, as compared with mechanical and pneumatic machines of the same volume, the known machine has a smaller area for foam formation and a smaller geometric length of the discharge weir (see Table 2).

TABLE 2

Design parameters of the known flotation column and of the pneumatic/mechanical flotation machine

| | | Flotation machine | |
| --- | --- | --- | --- |
| Design parameter | Dimension unit | Known flotation column | FPM-3.2 (6 chambers) |
| Machine volume | $m^3$ | 19 | 19.2 |
| Area of foam formation | $m^2$ | 3.8 | 16.8 |
| Length of discharge weir | m | 6.9 | 9.6 |

On account of this, the flotation process in the known flotation column has a series of disadvantages: the aeroflocks which form (structures consisting of air bubbles and of mineral particles) dwell for longer in the pulp than in mechanical and pneumatic machines from the moment of occurrence to the moment of supply to the foam product, and, because of a lack of free space on the pulp surface, aeroflock collision and mutual annihilation processes take place in the foam layer. The disadvantages of the flotation process in the known flotation column cause the lowering of its performance downstream of the foam product and lead to the situation where it does not function with sufficient efficiency in flotation stages with a rich initial raw material, where a high yield of the foam product is required.

SUMMARY

There exists a need for an increase in machine productivity.

According to an embodiment, the diameter of the widened housing part in the known machine, which contains a cylindrical housing consisting of a widened upper part and of the lower part, a feed, aeration and discharge device designed as ejectors, a discharge device and a foam collecting container, is determined by means of the following equation:

$$D = \sqrt{k_1 \cdot d \cdot (h_1 + h_2)}$$

In the equation:
D—the diameter of the widened upper part of the cylindrical housing;
$k_1$—an empirical coefficient for calculating the diameter of the widened upper part of the cylindrical housing, preferably selected from 1.0 to 1.4;
$h_1$—the height of the widened upper part of the housing, with the following relation h1=k2·h2;
k2—an empirical coefficient for calculating the height of the widened upper part of the cylindrical housing, selected from 0.2 to 1.0;
$h_2$—the height of the lower part of the cylindrical housing;
d—the diameter of the lower part of the cylindrical housing which is dependent on the required machine performance in terms of the feed material according to the equation $d^2 = k_3 \cdot Q$;
Q—the required machine performance in terms of the feed material, preferably determined in the dimension unit of metric tons per hour (t/h);

$k_3$—an empirical coefficient for calculating the diameter of the lower part of the cylindrical housing, selected from 0.015 to 0.03.

BRIEF DESCRIPTION OF THE DRAWINGS

The present invention is explained by way of example with reference to the drawings in which.

DETAILED DESCRIPTION

Figure 1:
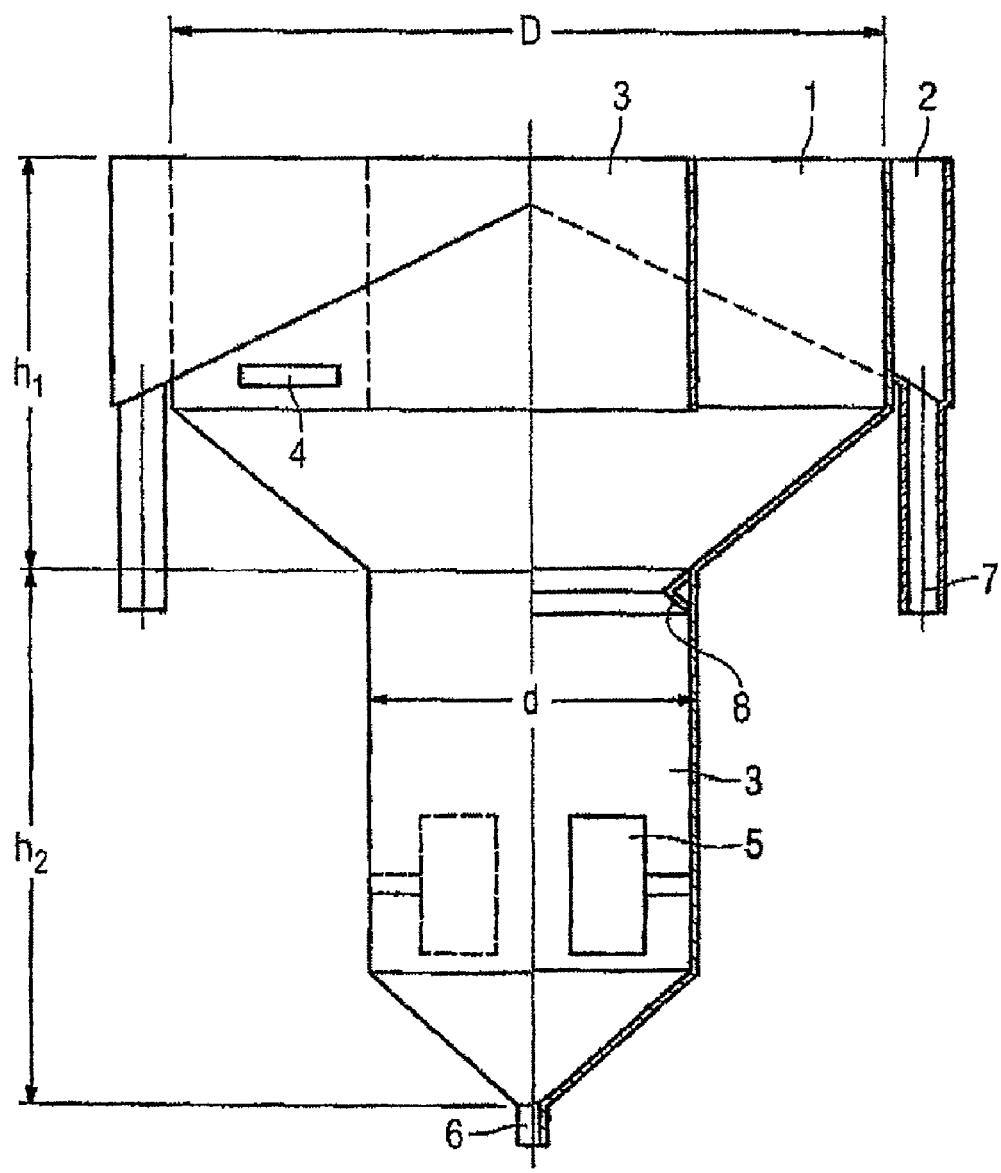
FIG. 1 shows the pneumatic flotation column according to an embodiment in an overall view illustrated in half section as a front view.

Thus, on the one hand, an increase in machine productivity in terms of the foam product by an enlargement in area of the widened upper part of the cylindrical housing can be brought about and, at the same time, a lowering of material intensity by the optimization of the dimensions can be effected.

According to another embodiment a method for dimensioning a pneumatic flotation column comprises the step of using the equation described above.

Furthermore, the foam collecting container of the pneumatic flotation column may, according to an embodiment, be designed as a gable-shaped channel and be equipped with opposite connection pieces for discharge of the foam product.

Advantageously, the gable-shaped channel, that is to say the gable-shaped foam channel, is mounted in such a way that surfaces on the basic flotation chamber 1 remain free, that is to say are available, for mounting one or more ejectors and/or other attachments.

The described design of the foam collecting container, implemented as a gable-shaped channel, allows almost a twofold reduction in its height, while a sufficient angle of inclination of the bottom is maintained.

The optimal diameter of the lower part of the cylindrical housing of the flotation column depends on the quantity of the pulp throughput, that is to say on the machine performance in terms of the feed material. As experimental investigations have shown, for the flotation machine with a diameter of the lower part of the housing of 1.4 m the optimal performance in terms of the feed material is 60 to 120 t/h (in terms of the pulp 160 to 320 m³/h). The throughput capacity of the machine in terms of the pulp was determined by means of the cross-sectional area of the lower part of the housing, the formula of which contains the diameter of the lower part of the housing, squared. Thus, the square of the optimal diameter of the lower part of the machine housing and its performance are linked by means of the equation $d^2=k_3 \cdot Q$, where the proportionality coefficient $k_3$ may assume the values of 0.015 to 0.03.

It was found in experimental investigations that, in the pneumatic flotation column, the optimal penetration depth of the feed and aeration device (ejector) into the pulp, which determines the height $h_1$ of the widened upper part of the cylindrical housing, is 1 to 2 m, and the optimal penetration depth of the aeration device (disperser), which determines the overall machine height $h_1+h_2$, is 4 to 6 m. Overshooting said values of the penetration depth into the pulp by the ejector and disperser leads to an unjustifiable increase in the overall height and the material intensity of the flotation machine, without an increase in its performance in terms of the feed and foam product. Hence, the optimal values $h_1$ and $h_2$ are linked by the equation $h_1=k_2 \cdot h_2$, in which the proportionality coefficient $k_2$ may assume the values of 0.2 to 1.0.

In experimental investigations, the dependence of the performance of the flotation column in terms of the foam product, in the case of the basic flotation of the copper-containing raw material, on the diameter of the widened upper part of the cylindrical housing and the overall height of the apparatus was determined (Table 3).

TABLE 3

Dependence of the flotation characteristic numbers of the copper-containing raw material on the diameter of the widened upper part of the cylindrical housing and the overall height of the column apparatus.

| Overall height | Diameter of the lower part | Diameter of the upper part | Flotation characteristic numbers, % | | | Performance in terms of the foam product, in metric |
|---|---|---|---|---|---|---|
| in meters (m) | in meters (m) | in meters (m) | yield of the foam product | Copper content in the foam product | Copper yield in the foam product | tons per hour (t/h) |
| 9 | 1.4 | 2.2 | 7.0 | 8.3 | 35.2 | 7.7 |
| 7.5 | 1.4 | 2.2 | 8.1 | 8.3 | 40.7 | 8.9 |
| 6 | 1.4 | 3.0 | 11.0 | 8.1 | 54.0 | 12.1 |
| 4 | 1.4 | 3.0 | 21.9 | 5.2* | 69.1 | 24.1 |

Note:
*foam product of unsatisfactory quality.

It is clear from the data listed in Table 3 that the optimal flotation results were achieved in the flotation machine, of which the diameter of the widened upper part D is linked to the diameter of the lower part d and the overall height of the apparatus $h_1+h_2$ by the following equation:

$$D=\sqrt{k_1 \cdot d \cdot (h_1+h_2)}=\sqrt{1.1 \cdot 1.4 \cdot 6}=3 \, m$$

In order to increase the conveying capacity of the foam collecting container in terms of the foam product, while at the same time reducing its height, the foam collecting container was designed as a gable-shaped channel and equipped with opposite connection pieces for discharging the foam product.

The pneumatic flotation column, that is to say the flotation machine, contains the basic flotation chamber 1 with the gable-shaped foam channel 2, within which the postflotation chamber 3 is accommodated. The chamber 1 is equipped with feed and aeration devices—ejectors 4, and the chamber 3 is equipped with an aeration device 5 which is accommodated in the lower part of the postflotation chamber 3. The postflotation chamber 3 is equipped with the bottom discharge device 6 and the foam channel 2 is equipped with connection pieces for discharging the foam product 7. The postflotation chamber 3 is provided with an annular baffle plate 8.

Figure 2:
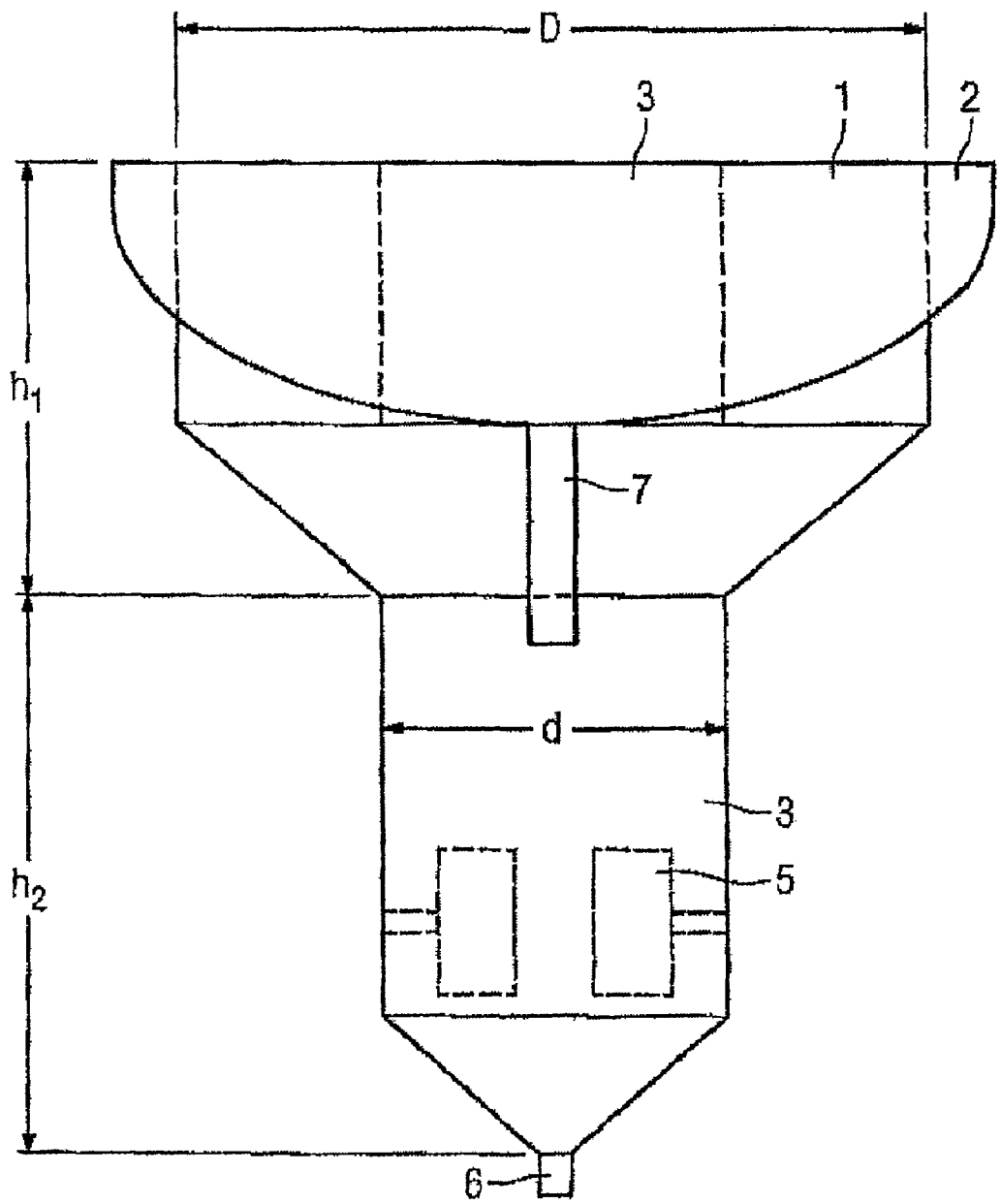
FIG. 2 shows a side view of the pneumatic flotation column according to an embodiment.
Figure 3:
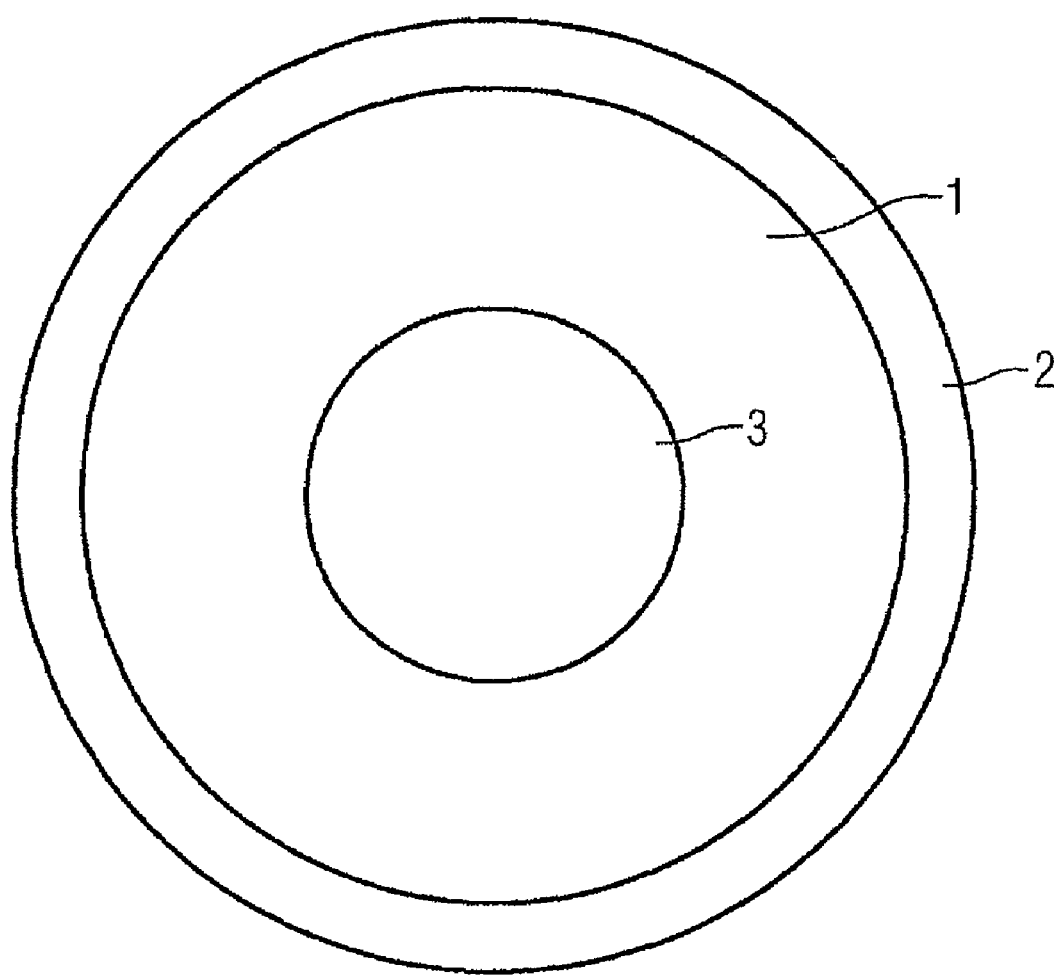
FIG. 3 shows a top view of the pneumatic flotation column according to an embodiment.

The flotation machine shown in FIGS. 1 to 3 has a diameter D of the widened upper part of the cylindrical housing which is larger than the diameter D of the lower part of the cylindrical housing of the flotation machine. The height of the widened upper part of the cylindrical housing is designated by $h_1$. The height of the lower part of the cylindrical housing of the flotation machine is designated by $h_2$. The overall height of the flotation machine is accordingly obtained as $h_1+h_2$.

The flotation machine shown functions in the following way. The pulp, previously processed by means of reagents, passes via the ejector 4 into the basic flotation chamber 1. At the same time, air is supplied to the ejector 4 and comes into contact with hydrophobic grains of the pulp, aeroflocks being obtained. The aeroflocks, when they float up, form the foam product. The foam product is discharged into the foam channel 2 and is delivered via the connection pieces 7 for thickening (not illustrated in the drawing). The grains having an insufficiently hydrophobic surface and the hydrophilic grains are supplied to the postflotation chamber 3. In the postflotation chamber 3, the aeroflocks arise which form the foam product in the upper part of the postflotation chamber 3. The annular baffle plate 8 makes it possible to make contact between the mineral and the air bubbles not in countercurrent, but, instead, at an angle, that is to say to create optimal conditions for the flotation of the grains in the postflotation chamber 3. The hydrophilic grains sink onto the bottom part of the postflotation chamber 3 and are discharged via the bottom discharge device 6. The foam product passes out of the postflotation chamber 3 over its top edge onto the foam layer of the basic flotation chamber and subsequently into the foam channel 2.

The flotation machine according to an embodiment was tested, in the case of the basic flotation of copper-containing ore, in comparison with the known machine KFM-1400. The test results are illustrated in Table 4.

TABLE 4

Test results

| Serial no. | Designation of the characteristic numbers | Flotation machines | |
|---|---|---|---|
| | | Machine according to an embodiment | KFM-1400 |
| 1. | Machine height, in meters (m) | 6 | 9 |
| 2. | Diameter of the basic flotation chamber, in meters (m) | 3.0 | 2.2 |
| 3. | Machine volume, in cubic meters (m³) | 14.7 | 19 |
| 4. | Performance in terms of the foam product, in metric tons per hour (t/h) | 11.0 | 7.0 |
| 5. | Copper content in the foam product, as a percentage (%) | 8.12 | 8.31 |

The results in Table 4 show clearly that the design according to an embodiment of the pneumatic flotation column, by increasing the diameter of the widened upper part of the cylindrical housing and by optimizing the dimensions, makes it possible to have an increase in performance in terms of the foam product, while at the same time lowering its volume and the material intensity.

According to various embodiments, the machine productivity can be increased in terms of the foam product by enlarging the area of the widened upper part of the cylindrical housing and by lowering the material intensity by optimizing its dimensions. Said result is achieved in that, in the known machine which contains a cylindrical housing, consisting of a widened upper part and of the lower part, a feed, aeration and discharge device designed as ejectors, a discharge device and a foam collecting container, the diameter of the widened housing part was determined by means of an equation as a function of the diameter of the lower part of the cylindrical housing, of the height of the widened upper part of the cylindrical housing and of the height of the lower part of the cylindrical housing. Furthermore, the foam collecting container of the pneumatic flotation column is designed as a gable-shaped channel and is equipped with opposite connection pieces for discharging the foam product.

The invention claimed is:

1. A pneumatic flotation column, comprising a cylindrical housing consisting of the widened upper part having a diameter D and a height $h_1$ and of the lower part having a diameter d and a height $h_2$, a feed, aeration and discharge device and a foam collecting container, wherein the diameter D of the widened upper part of the cylindrical housing corresponds to the following equation:

$$D=\sqrt{k_1 \cdot d \cdot (h_1+h_2)}$$

in which:
D is the diameter of the widened upper part of the cylindrical housing [m];
$k_1$ is the empirical coefficient for calculating the diameter of the widened upper part of the cylindrical housing, selected from 1.0 to 1.4;
$h_1$ is the height of the widened upper part of the housing, equal to $h_1=k_2 \cdot h_2$ [m];
$k_2$ is the empirical coefficient for calculating the height of the widened upper part of the cylindrical housing, selected from 0.2 to 1.0;
$h_2$ is the height of the lower part of the cylindrical housing [m];
d is the diameter of the lower part of the cylindrical housing, which is dependent on the required machine performance in terms of the feed material according to the equation $d^2=k_3 \cdot Q$ [m];
Q is the required machine performance in terms of the feed material [t/h];
$k_3$ is the empirical coefficient for calculating the diameter of the lower part of the cylindrical housing, selected from 0.015 to 0.03 [m²h/t].

2. The pneumatic flotation column according to claim 1, wherein the foam collecting container is designed as a gable-shaped foam channel and is equipped with opposite connection pieces for discharging the foam product.

3. The pneumatic flotation column according to claim 2, wherein the gable-shaped foam channel is mounted in such a way that surfaces on the basic flotation chamber are available for mounting at least one ejector and/or other attachments.

4. A method for dimensioning a pneumatic flotation column which comprises a cylindrical housing having a widened upper part having a diameter D and a height $h_1$, and a lower part having a diameter d and a height $h_2$, comprising the step determining the diameter of the widened upper part of the pneumatic flotation column by $$D=\sqrt{k_1 \cdot d \cdot (h_1+h_2)}$$

in which:

D is the diameter of the widened upper part of the cylindrical housing [m];

$k_1$ is the empirical coefficient for calculating the diameter of the widened upper part of the cylindrical housing, selected from 1.0 to 1.4;

$h_1$ is the height of the widened upper part of the housing, equal to $h_1 = k_2 \cdot h_2$ [m];

$k_2$ is the empirical coefficient for calculating the height of the widened upper part of the cylindrical housing, selected from 0.2 to 1.0;

$h_2$ is the height of the lower part of the cylindrical housing [m];

d is the diameter of the lower part of the cylindrical housing, which is dependent on the required machine performance in terms of the feed material according to the equation $d^2 = k_3 \cdot Q$ [m];

Q is the required machine performance in terms of the feed material [t/h];

$k_3$ is the empirical coefficient for calculating the diameter of the lower part of the cylindrical housing, selected from 0.015 to 0.03 [m²h/t].

5. A pneumatic flotation column, comprising a cylindrical housing consisting of the widened upper part having a diameter D and a height $h_1$ and of the lower part having a diameter d and a height $h_2$, a feed, aeration and discharge device and a foam collecting container designed as a gable-shaped foam channel and equipped with opposite connection pieces for discharging the foam product, wherein the diameter D of the widened upper part of the cylindrical housing corresponds to the following equation:

$$D = \sqrt{k_1 \cdot d \cdot (h_1 + h_2)}$$

in which:

D is the diameter of the widened upper part of the cylindrical housing [m];

$k_1$ is the empirical coefficient for calculating the diameter of the widened upper part of the cylindrical housing, selected from 1.0 to 1.4;

$h_1$ is the height of the widened upper part of the housing, equal to $h_1 = k_2 \cdot h_2$ [m];

$k_2$ is the empirical coefficient for calculating the height of the widened upper part of the cylindrical housing, selected from 0.2 to 1.0;

$h_2$ is the height of the lower part of the cylindrical housing [m];

d is the diameter of the lower part of the cylindrical housing, which is dependent on the required machine performance in terms of the feed material according to the equation $d^2 = k_3 \cdot Q$ [m];

Q is the required machine performance in terms of the feed material [t/h];

$k_3$ is the empirical coefficient for calculating the diameter of the lower part of the cylindrical housing, selected from 0.015 to 0.03 [m²h/t].

6. The pneumatic flotation column according to claim 5, wherein the gable-shaped foam channel is mounted in such a way that surfaces on the basic flotation chamber are available for mounting at least one ejector and/or other attachments.

* * * * *